United States Patent
Papadopoulos

(10) Patent No.: US 11,070,093 B1
(45) Date of Patent: Jul. 20, 2021

(54) POWER TRANSFER FOR RADIO-FREQUENCY RECTIFIERS

(71) Applicant: Atmosic Technologies Inc., Campbell, CA (US)

(72) Inventor: Dimitrios Filippos Papadopoulos, Belmont, CA (US)

(73) Assignee: Atmosic Technologies Inc., Campbell, CA (US)

( * ) Notice: Subject to any disclaimer, the term of this patent is extended or adjusted under 35 U.S.C. 154(b) by 0 days.

(21) Appl. No.: 16/866,944

(22) Filed: May 5, 2020

(51) Int. Cl.
*H02J 50/20* (2016.01)
*H02J 50/00* (2016.01)

(52) U.S. Cl.
CPC ............ *H02J 50/20* (2016.02); *H02J 50/001* (2020.01)

(58) Field of Classification Search
CPC .......... H02J 50/001; H02J 50/20; H02J 50/23; H02J 50/27
See application file for complete search history.

(56) References Cited

U.S. PATENT DOCUMENTS

| | | | | |
|---|---|---|---|---|
| 7,944,279 B1* | 5/2011 | El Waffaoui | ........... | H02M 3/073 327/536 |
| 9,800,172 B1* | 10/2017 | Leabman | ................ | H02M 7/06 |
| 2004/0001453 A1* | 1/2004 | Kawai | ..................... | H02J 7/025 370/311 |
| 2005/0104453 A1* | 5/2005 | Vanderelli | ............... | H02J 50/12 307/151 |
| 2009/0127934 A1* | 5/2009 | Sbuell | ..................... | H02J 9/061 307/66 |
| 2010/0003939 A1* | 1/2010 | Kong | ..................... | H04B 17/21 455/226.2 |
| 2017/0070160 A1* | 3/2017 | Mortazawi | .............. | H02M 7/06 |
| 2018/0019621 A1* | 1/2018 | Lin | ...................... | B23Q 1/0009 |
| 2018/0226840 A1* | 8/2018 | Leabman | ................ | H02J 7/025 |
| 2018/0316225 A1* | 11/2018 | Yeo | ..................... | H02M 7/2173 |
| 2018/0366981 A1* | 12/2018 | Liao | ................... | H02M 7/53846 |
| 2019/0305606 A1* | 10/2019 | Jiang | ....................... | H02J 50/23 |
| 2020/0311506 A1* | 10/2020 | Yamauchi | .......... | G06K 19/0709 |

* cited by examiner

*Primary Examiner* — Levi Gannon
(74) *Attorney, Agent, or Firm* — Paradice & Li LLP

(57) ABSTRACT

This disclosure provides a method and apparatus for optimizing power transfer from radio-frequency (RF) rectifiers to a voltage regulator. A first RF rectifier may be configured to generate a first voltage and a second RF rectifier may be configured to generate a second voltage, where the second voltage is an open circuit output voltage. The voltage regulator may regulate the first voltage to provide power. A controller may be configured to optimize power transfer from the first RF receiver to the voltage regulator based on the first voltage and the second voltage.

17 Claims, 8 Drawing Sheets

POWER TRANSFER FOR RADIO-FREQUENCY RECTIFIERS

TECHNICAL FIELD

The present embodiments relate generally to wireless devices powered at least in part by power harvested from radio-frequency (RF) energy, and specifically to methods and apparatuses for controlling the operations of power harvesting RF rectifiers.

BACKGROUND OF RELATED ART

Wireless devices (such as Wi-Fi devices, Bluetooth devices, wireless sensors, IoT devices, and the like) may include a plurality of radio-frequency (RF) power harvesters (often referred to as RF rectifiers) that capture and convert RF energy into power, such as direct current (DC) power. RF rectifier operation may be determined, in part, by operating conditions. For example, as RF signal strength increases or decreases, the power produced by the RF rectifiers may also increase or decrease. In another example, RF rectifier loading (e.g., current drawn from the RF rectifier or an impedance seen by an output of the RF rectifier) may also affect RF rectifier power output.

The output power produced by the RF rectifier may be provided to a voltage regulator for regulation. As RF rectifier output power changes, the amount of power transferred from the RF rectifier to the voltage regulator also changes. In some cases, power transfer may also be affected by an impedance mismatch between the RF rectifier and the voltage regulator. Unfortunately, the impedance of the RF rectifier may vary based on operating conditions. The varying impedance of the RF rectifier makes maximizing or optimizing power transfer difficult.

Thus, there is a need to intelligently control operations associated with RF rectifiers to maximize operating efficiency.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter described herein may be implemented as a wireless device. The wireless device may include a first radio-frequency (RF) rectifier configured to generate a first voltage from a first RF signal, a second RF rectifier configured to generate a second voltage from the RF signal, wherein the second voltage is an open circuit output voltage, and a voltage regulator coupled to the first RF rectifier and configured to regulate the first voltage to provide power to the wireless device. Further, the wireless device may include a controller configured to optimize power transfer from the first RF rectifier to the voltage regulator based at least in part on the first voltage and the second voltage.

Another aspect of the subject matter of this disclosure may be implemented as a method of optimizing power transfer from radio-frequency (RF) rectifiers to a voltage regulator. The method may include generating, by a RF rectifier, a first voltage, generating, by a second RF rectifier, a second voltage, wherein the second voltage is an open circuit output voltage, and regulating, by a voltage regulator, the first voltage to provide power to a wireless device. The method may also include optimizing power transfer from the first RF rectifier to the voltage regulator based at least in part on the first voltage and the second voltage.

Another innovative aspect of the subject matter described in this disclosure may be implemented as another apparatus. The apparatus may include a means for generating a first voltage via first radio-frequency (RF) rectifier, a means for generating a second voltage via a second RF rectifier, wherein the second voltage is an open circuit output voltage, and a means for regulating, via a voltage regulator, the first voltage to provide power to a wireless device. The apparatus may also include a means for optimizing power transfer from the first RF rectifier to the voltage regulator based at least in part on the first voltage and the second voltage.

BRIEF DESCRIPTION OF THE DRAWINGS

Aspects of the present disclosure are illustrated by way of example and are not intended to be limited by the figures of the accompanying drawings. Like numbers reference like elements throughout the drawings and specification.

DETAILED DESCRIPTION

Figure 1:
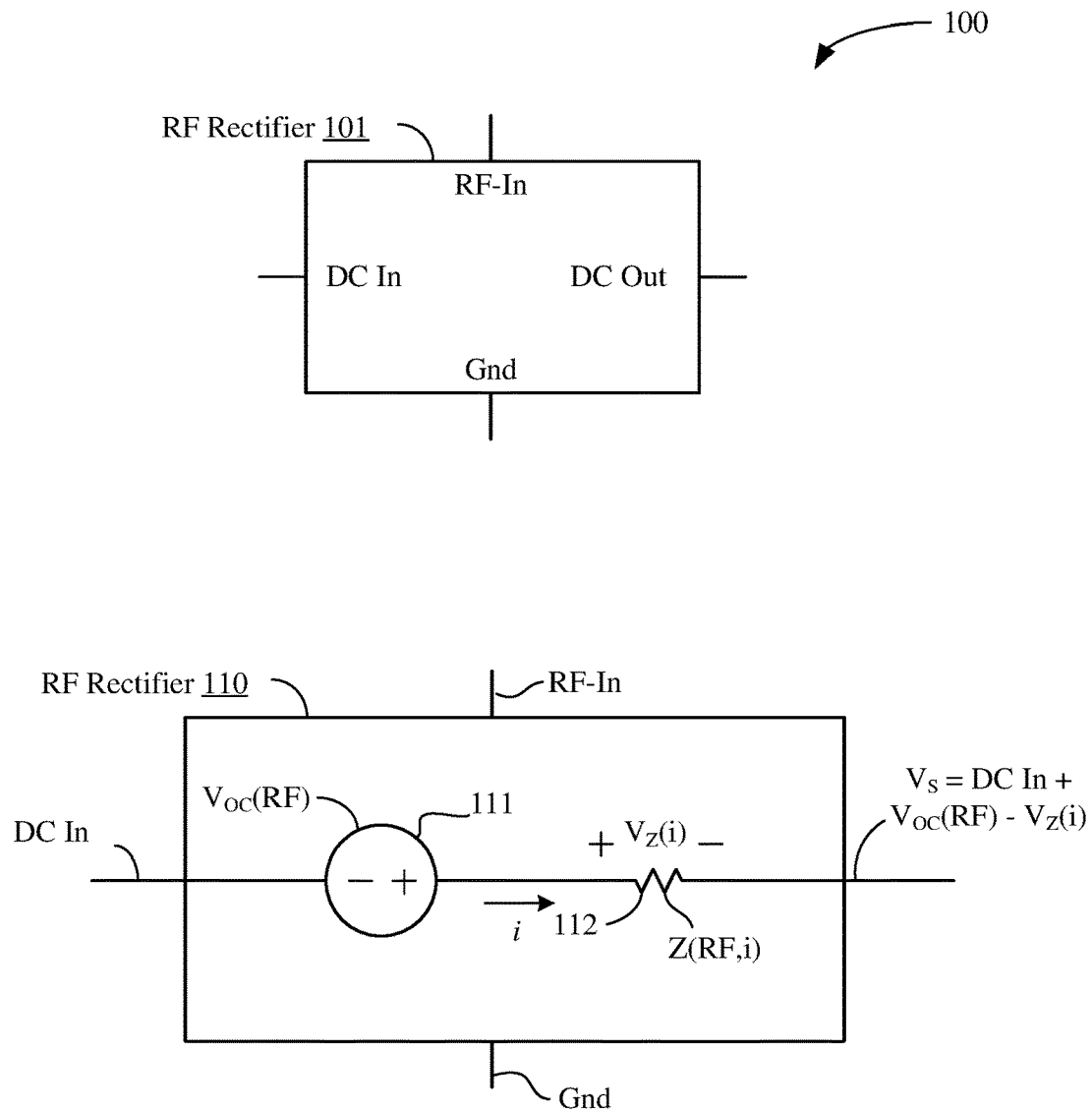
FIG. 1 shows simplified diagrams of implementations of radio-frequency (RF) rectifiers.

In the following description, numerous specific details are set forth such as examples of specific components, circuits, and processes to provide a thorough understanding of the disclosure. The term "coupled" as used herein means coupled directly to or coupled through one or more intervening components or circuits. Also, in the following description and for purposes of explanation, specific nomenclature is set forth to provide a thorough understanding of the example embodiments. However, it will be apparent to one skilled in the art that these specific details may not be required to practice the example embodiments. In other instances, well-known circuits and devices are shown in block diagram form to avoid obscuring the disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The example embodiments are not to be construed as limited to specific examples described herein but rather to include within their scope all embodiments defined by the appended claims.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory computer-readable storage medium comprising instructions that, when executed, performs one or more of the methods described below. The non-transitory computer-readable storage medium may form part of a computer program product, which may include packaging materials.

The non-transitory computer-readable storage medium may include random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a computer-readable communication medium that carries or communicates code in the form of instructions or data structures and that may be accessed, read, and/or executed by a computer or other processor.

The various illustrative logical blocks, modules, circuits and instructions described in connection with the implementations disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general-purpose processor may be a microprocessor, but in the alternative, the processor may be any conventional processor, controller, microcontroller, or state machine. A processor may also be implemented as a combination of computing devices (such as a combination of a DSP and a microprocessor), a plurality of microprocessors, one or more microprocessors in conjunction with a DSP core, or any other suitable configuration.

FIG. 1 shows simplified diagrams 100 of implementations of radio-frequency (RF) rectifiers. A first diagram shows an RF rectifier 101 as a four-port device. That is, the RF rectifier 101 is depicted as having four input and/or output terminals. The RF rectifier 101 may receive an RF signal through an RF-In port and may be coupled to ground through a Gnd port. The RF rectifier 101 may convert energy in the received RF signal into DC power. The generated DC power is coupled to a DC Out port. In some implementations, the RF rectifier 101 may receive a DC voltage through the DC In port. The received DC voltage may be added to the generated DC power. Thus, the DC Out voltage=DC In port voltage+generated DC power. In this manner, a plurality of RF rectifiers 101 may be daisy chained to provide DC voltages greater than the DC voltage produced by a single RF rectifier.

A second diagram shows an RF rectifier 110 as a small-signal model. The RF rectifier 110 receives RF signals through the RF-In port and is coupled to ground through the Gnd port. The DC power generated by the RF rectifier 110 is modeled by a voltage source 111. Impedance of the RF rectifier 110 is modeled by impedance 112. Operation of the RF rectifier 110 may depend on operating conditions. For example, the DC power ($V_{OC}$) generated by the voltage source 111 may depend, directly or indirectly, on RF energy or signal strength. Expressed as a function, DC power=$V_{OC}$(RF) where RF is received RF energy. In a similar manner, value of the impedance 112 may also depend, directly or indirectly, on the RF energy or signal strength and output current i. Expressed as a function, impedance=Z(RF,i). Thus, a voltage (denoted as $V_Z(i)$) may be "dropped" across impedance 112 based on output current i and impedance Z. As described above, in some implementations, the generated DC power may be added to a DC input voltage. In some implementations, output voltage of the RF rectifier 110 may be expressed as $V_S(RF,i)=V_{OC}(RF)-V_Z(RF,i)$. Those skilled in the art will recognize that there are many feasible implementations and representations of RF rectifiers. Thus, the RF rectifiers 101 and 110 are meant to be illustrative and not limiting.

Figure 2:
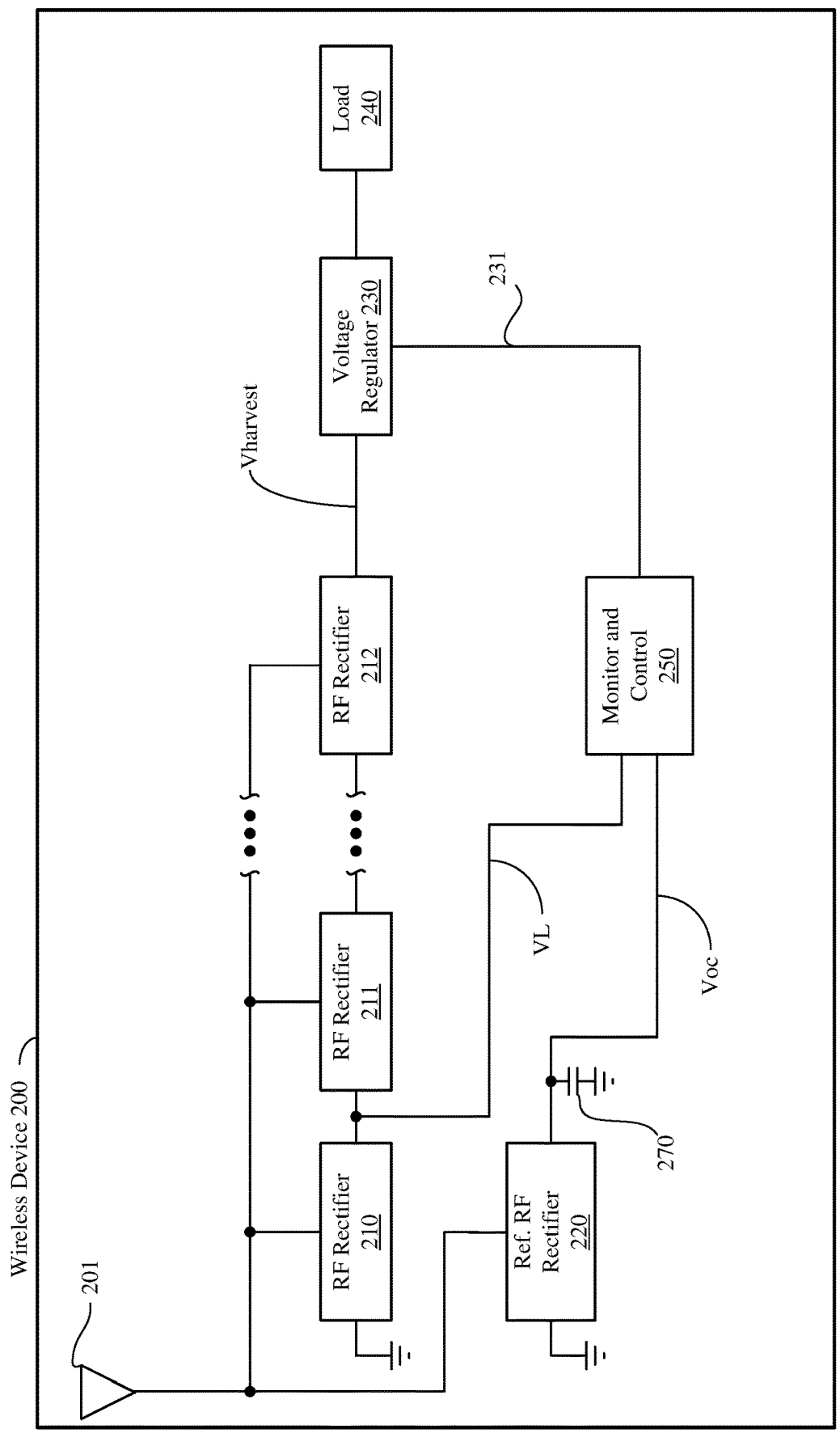
FIG. 2 shows a block diagram of a wireless device within which aspects of the present disclosure may be implemented.

FIG. 2 shows a block diagram of a wireless device 200 within which aspects of the present disclosure may be implemented. The wireless device 200 may include an antenna 201, RF rectifiers 210-212, a reference RF rectifier 220, a voltage regulator 230, a load 240, and a monitor and control block 250. The RF rectifiers 210-212 and the reference RF rectifier 220 may be implementations of any of the RF rectifiers of FIG. 1. The antenna 201 may be coupled to each of the RF rectifiers 210-212 and the reference RF rectifier 220. The antenna 201 may capture and provide RF energy.

The RF rectifiers 210-212 may be coupled together serially, in a daisy chain fashion. Thus, DC power generated by the RF rectifier 210 may be added to the DC power from the RF rectifier 211. This process may be repeated for as many RF rectifiers are serially coupled together. Although the wireless device 200 includes three RF rectifiers 210-212, in other implementations, the wireless device 200 may include any feasible number of RF rectifiers. Moreover, other arrangements of the RF rectifiers are possible. For example, the wireless device 200 may include multiple daisy chains of RF rectifiers. Other example arrangements of RF rectifiers are described below with respect to FIGS. 5-8.

The output of the RF rectifier 212 is coupled to the voltage regulator 230. The voltage regulator 230 may receive the DC voltage (denoted as a harvest voltage, Vharvest) from the RF rectifiers 210-212 and process the DC voltage for use by the wireless device 200. In some implementations, the voltage regulator 230 may be a buck switching regulator, a boost switching regulator, a buck/boost switching regulator, or any other feasible voltage regulator. Furthermore, the voltage regulator 230 may receive an impedance control signal 231. In some implementations, the impedance control signal 231 may include one or more signals that may control buck and/or boost operations. Changing a period, duty-cycle, and/or frequency of the impedance control signal 231 (e.g., changing a period, duty-cycle or frequency of buck or boost operations) may affect an input impedance of the voltage regulator 230. The output of the voltage regulator 230 may be coupled to the load 240. The load 240 may represent one or more circuits that may be powered by the voltage regulator 230.

In some implementations, the load 240 may consume current based on operations performed by the wireless device 200. For example, as the wireless device 200 performs more operations, the load 240 consumes more current. On the other hand, as the wireless device 200 performs fewer operations, the load 240 consumes less current. In some implementations, the load 240 may include a power storage device such as a capacitor or a battery (not shown for simplicity) The capacitor and/or battery may store residual or excess energy from the RF rectifiers 210-212. For example, a capacitor or battery may be used to store power from the RF rectifiers 210-212 that is not consumed by the wireless device 200.

The reference RF rectifier 220 may be similar to any of the RF rectifiers 210-212. In contrast to the RF rectifiers 210-212, the reference RF rectifier 220 may have an "unloaded" or "open circuit" output. That is, output of the reference RF rectifier 220 may not be coupled directly or indirectly to a substantial load. Thus, the reference RF rectifier 220 may provide an open circuit DC output voltage (denote as $V_{OC}$). A capacitor 270 may optionally be coupled to the output of the reference RF rectifier 220 to help smooth and stabilize $V_{OC}$.

Power transfer from the RF rectifiers 210-212 to the voltage regulator 230 and the load 240 may vary as RF conditions and wireless device 200 operations change. Thus, some RF conditions and/or wireless device 200 operations may cause inefficient power transfer.

In some implementations, output voltages from one or more of the RF rectifiers 210-212 may be compared to one or more voltages from the reference RF rectifier 220 to improve power transfer efficiency. For example, the monitor and control block 250 may monitor one or more voltages associated with the RF rectifiers 210-212 and one or more voltages associated with the reference RF rectifier 220. In response to the monitored voltages, the monitor and control block 250 may control the input impedance of the voltage regulator 230 through the impedance control signal 231. Changing the input impedance of the voltage regulator 230 may change operation of the RF rectifiers 210-212 and can increase power transfer efficiency from the RF rectifiers 210-212 to the voltage regulator 230 and the load 240.

Figure 3:
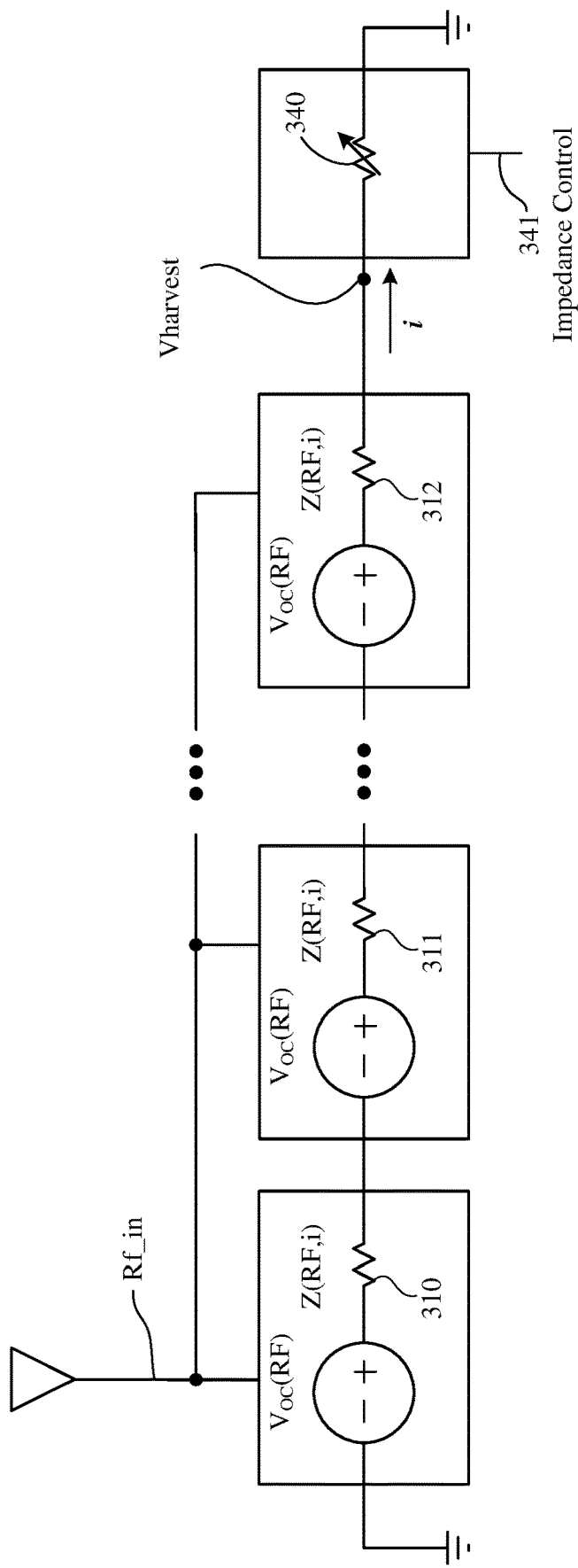
FIG. 3 is a simplified impedance model of the wireless device of FIG. 2.

FIG. 3 is a simplified impedance model 300 of the wireless device 200 of FIG. 2. The impedance model 300 may include RF rectifier impedances 310, 311 and 312 corresponding to the RF rectifiers 210, 211, and 212, respectively. The impedance model 300 may also include an input impedance 340 corresponding to a combined impedance associated with the voltage regulator 230 and the load 240. As described above with respect to FIG. 2, the RF rectifiers 210-212 may provide the Vharvest voltage to the voltage regulator 230 and the load 240. Thus, with respect to FIG. 3, the Vharvest voltage is delivered to the input impedance 340.

The impedance model 300 may include one impedance for each RF rectifier included in the wireless device 200. Thus, although only three rectifier impedances are shown (e.g., rectifier impedances 310-312) coupled to the input impedance 340, the number of rectifier impedances included in the impedance model 300 may correspond to the number of RF rectifiers included in the wireless device 200.

In some implementations, power transfer from the RF rectifiers 210-212 to the input impedance 340 (e.g., the voltage regulator 230 and the load 240) may be optimized when an output voltage of each of the RF rectifiers 210-212 is one half (0.5) of an open circuit (unloaded) output voltage of an equivalent RF rectifier (e.g., the output voltage associated with the reference RF rectifier 220). In other words, a more optimal transfer of power from the RF rectifiers 210-212 to the voltage regulator 230 and the load 240 may occur when a voltage ratio of approximately 0.5 is maintained between an output voltage of one of the RF rectifiers 210-212 and an open circuit output voltage of a the reference RF rectifier 220.

As described with respect to the RF rectifier 110 of FIG. 1, the output voltage and the impedance of each of the RF rectifiers 210-212 may be dependent on input RF energy and output current i. Thus, although the input RF energy may not be controllable, output current i may be controlled, to some extent, by changing the input impedance 340. In some aspects, changing the input impedance 340 may change operation of the RF rectifiers 210-212 such that the output voltage of each RF rectifier becomes approximately 0.5 the output voltage of the reference RF rectifier 220. In some implementations, the input impedance 340 may be changed and/or controlled with an impedance control signal 341.

In some implementations, other voltage ratios (e.g., voltage ratios other than 0.5) may be used. For example, a voltage ratio between an output voltage of a loaded RF rectifier to an open circuit output voltage of an RF rectifier may be 0.6, 0.7, or any other feasible voltage ratio. (A loaded RF rectifier may refer to any of RF rectifiers 210-212.) The voltage ratio associated with optimal power transfer may be determined through experimentation, measurement, and/or simulation. Furthermore, the voltage ratio may be fixed or may be programmable while the wireless device 200 is in operation.

Thus, in some implementations, power transfer efficiency of the RF rectifiers 210-212 may be controlled, at least in part, by changing the input impedance 340. For example, changing the input impedance 340 via the impedance control signal 341 may change the current i supplied by the RF rectifiers 210-212. Changing the current i may change operation of the RF rectifiers 210-212 such that the output voltage of each RF rectifier 210-212 is approximately 0.5 the open circuit output voltage of the reference RF rectifier 220.

Returning to FIG. 2, the monitor and control block 250 may monitor voltages associated with different RF rectifiers within the wireless device 200 and adjust the voltage regulator 230 based on the monitored voltages to optimize power transfer (e.g., adjust the input impedance 340 to be approximately equal to the sum of the rectifier impedances 310-312). For example, the monitor and control block 250 may determine the open circuit output voltage of an unloaded RF rectifier and also determine the output voltage of any loaded RF rectifier. In the example of FIG. 2, the unloaded RF rectifier is the reference RF rectifier 220 and the loaded RF rectifier is the RF rectifier 210 (that is, the output of RF rectifier 210 is loaded by the input of the RF rectifier 211). The monitor and control block 250 may compare the open circuit output voltage (denoted as $V_{OC}$) to the loaded voltage (denoted as VL) and determine, based on the voltage ratio of VL to $V_{OC}$, whether to change or adjust the impedance of the voltage regulator 230. The impedance of the voltage regulator 230 may be adjusted with the impedance control signal 231. As described above, the impedance control signal 231 may control buck and/or boost operations of the voltage regulator 230 and as well as affect the input impedance of the voltage regulator 230. In some implementations, the monitor and control block 250 may perform the voltage comparison using a two input analog comparator.

Figure 4:
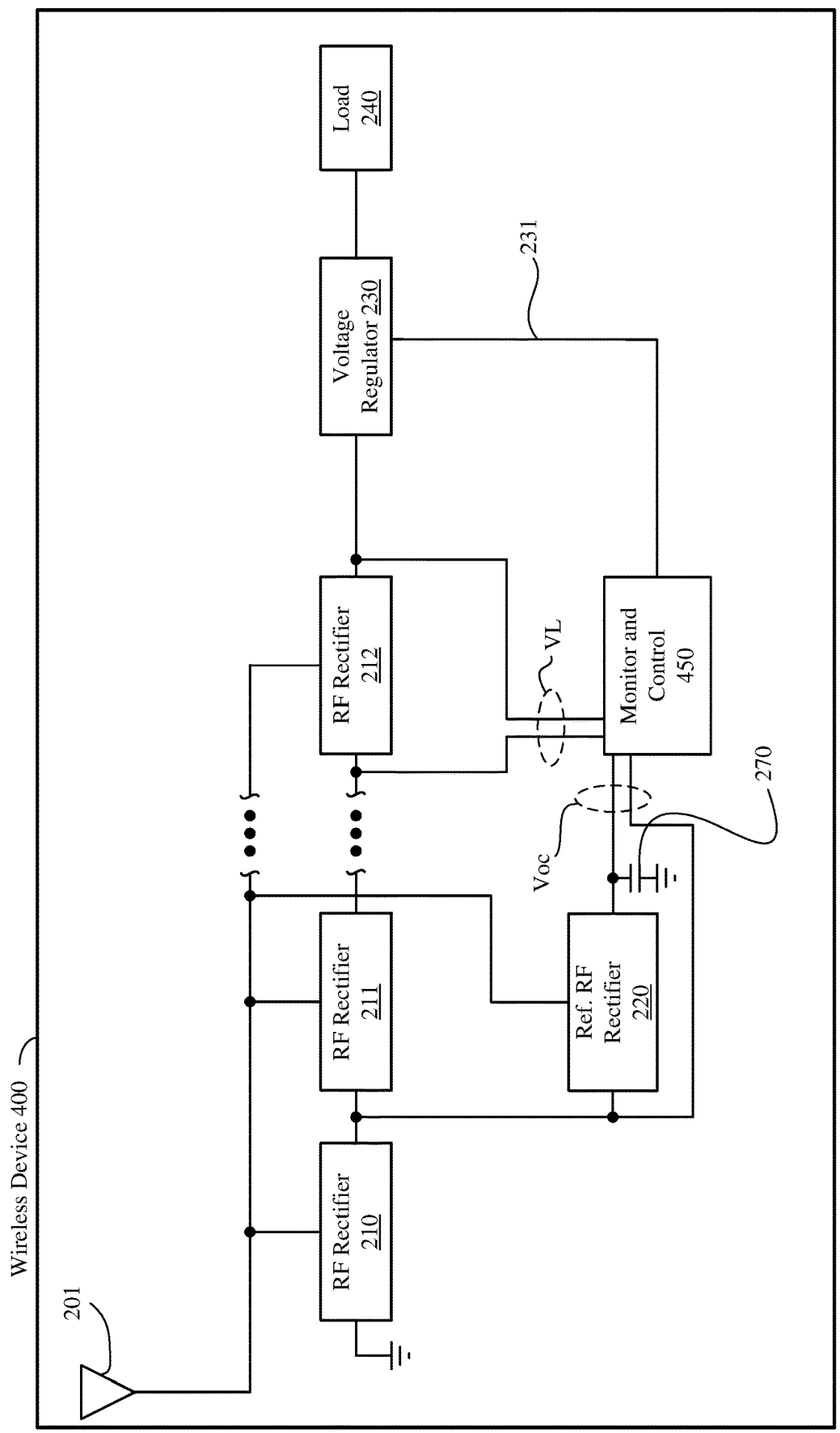
FIG. 4 shows a block diagram of a wireless device within which aspects of the present disclosure may be implemented.

FIG. 4 shows a block diagram of a wireless device 400 within which aspects of the present disclosure may be implemented. The wireless device 400 may include the antenna 201, the RF rectifiers 210-212, the reference RF rectifier 220, the voltage regulator 230, and the load 240 as described with respect to the wireless device 200 of FIG. 2. In addition, the wireless device 400 may include a monitor and control block 450.

Similar to the wireless device 200, the RF rectifiers 210-212 may be arranged in a daisy chain fashion. The monitor and control block 450 may be coupled across any one of the RF rectifiers 210-212 to determine the loaded RF rectifier voltage VL. In the example of FIG. 4, the monitor and control block 450 is coupled to a voltage input and a voltage output of the RF rectifier 212. The loaded RF rectifier voltage VL may be determined as a differential (difference) voltage between the voltage output and the voltage input. In a similar manner, the monitor and control block 450 may be coupled to a voltage input and a voltage output of the reference RF rectifier 220 thereby enabling the open circuit output voltage $V_{OC}$ of the reference RF rectifier 220 to be determined differentially. Similar to the monitor and control block 250, the monitor and control block 450 may compare the loaded RF rectifier voltage VL to the open circuit output voltage $V_{OC}$ and determine, based on the voltage ratio of VL to $V_{OC}$, whether to change or adjust the impedance of the voltage regulator 230 through the impedance control signal 231 to optimize power transfer.

Thus, although the configuration of the RF rectifiers 210-212 and the reference RF rectifier 220 of the wireless device 400 differs from that of the wireless device 200, power transfer efficiency from the RF rectifiers 210-212 may be optimized in a similar manner Differential voltages instead of single-ended voltages may be used to determine VL and $V_{OC}$. In some implementations, the monitor and control block 450 may include an analog comparator with two sets of differential inputs to compare the VL and $V_{OC}$ voltages. Other implementations may mix and match single-ended and differential signals to determine either the VL or $V_{OC}$ voltages.

Figure 5:
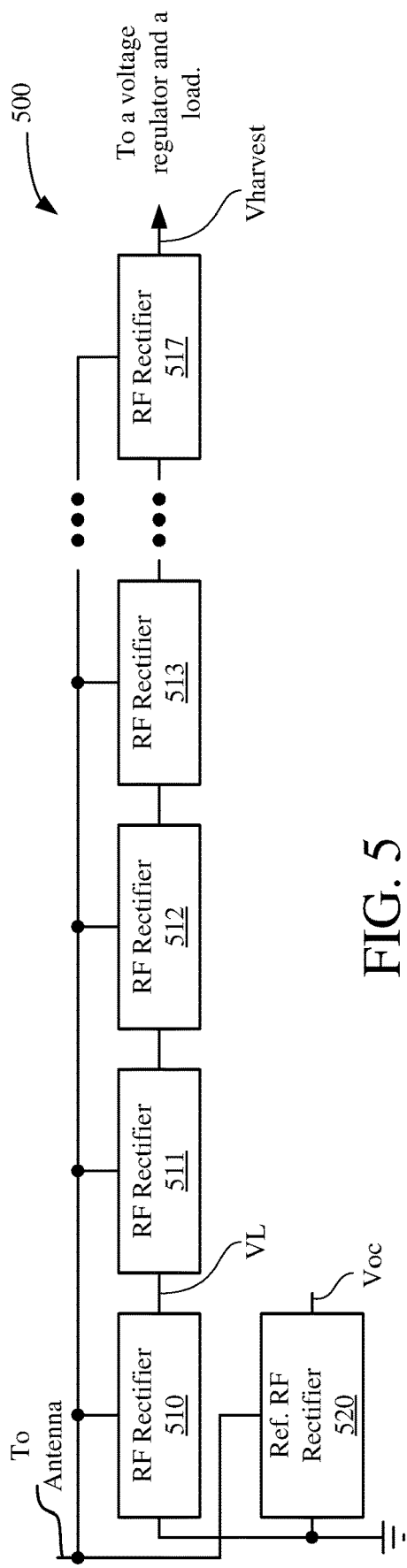
FIG. 5 shows one implementation of an eight-stage rectifier, within which aspects of the present disclosure may be implemented.

FIG. 5 shows one implementation of an eight-stage rectifier 500, within which aspects of the present disclosure may be implemented. The eight-stage rectifier 500 may include eight RF rectifiers 510-517 and a reference RF rectifier 520. The RF rectifiers 510-517 may be implementations of any of the RF rectifiers 210-212 of FIG. 2. In a similar manner, the reference RF rectifier 520 may be an implementation of the reference RF rectifier 220.

As shown, the eight RF rectifiers 510-517 may be coupled together in a single daisy chain to generate the Vharvest voltage. The Vharvest voltage may be provided to a voltage regulator and a load, not shown for simplicity. The loaded RF rectifier voltage VL and the open circuit output voltage $V_{OC}$ may be provided by the RF rectifier 510 and the reference RF rectifier 520, respectively. The voltages VL and $V_{OC}$ may be provided to a monitor and control block to control an impedance of a voltage regulator and optimize power transfer from the RF rectifiers to the voltage regulator and the load (monitor and control block, voltage regulator, and load not shown for simplicity). In the example of FIG. 5, all eight of the RF rectifiers 510-517 are connected in series, enabling the largest possible Vharvest voltage to be generated.

Figure 6:
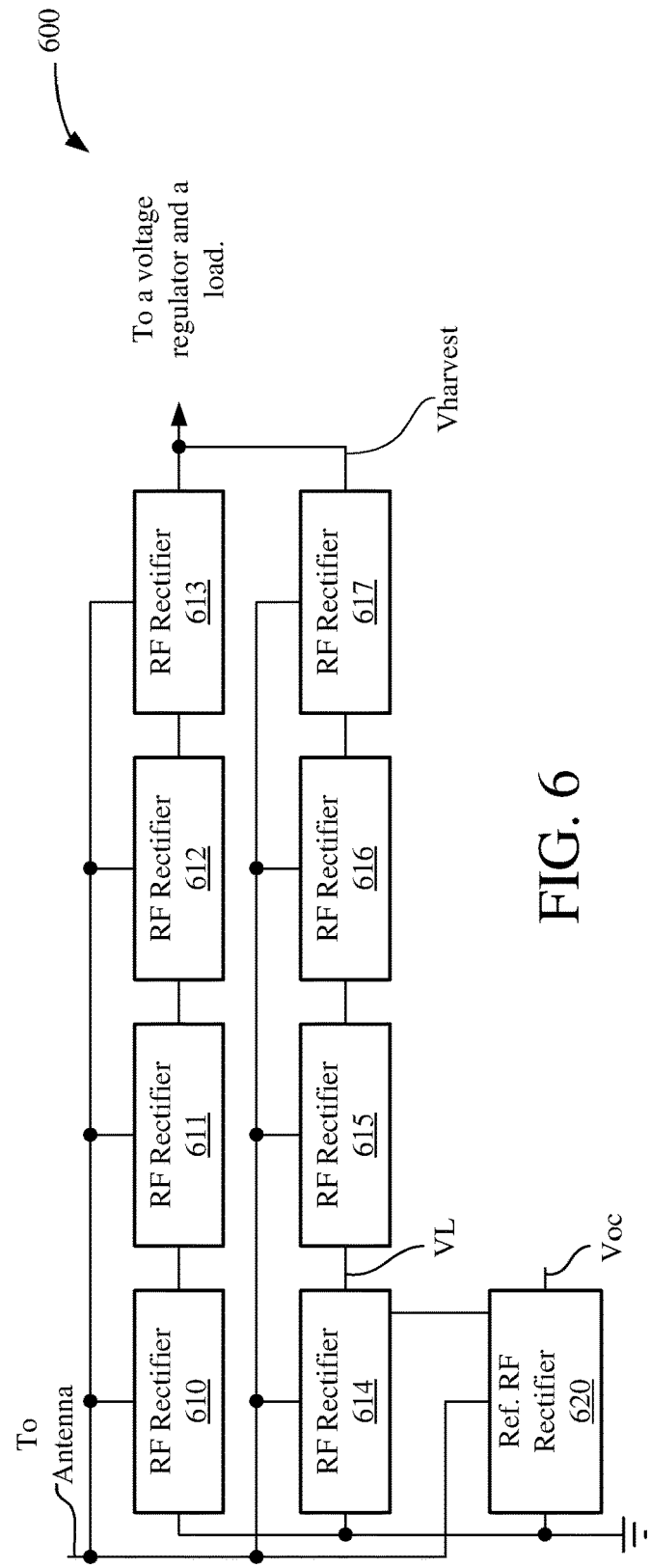
FIG. 6 shows another implementation of a four-stage rectifier, within which aspects of the present disclosure may be implemented.

FIG. 6 shows one implementation of a four-stage rectifier 600, within which aspects of the present disclosure may be implemented. The four-stage rectifier 600 may include eight RF rectifiers 610-617, and a reference RF rectifier 620. The RF rectifiers 610-617 may be implementations of any of the RF rectifiers 210-212 of FIG. 2. Similarly, the reference RF rectifier 620 may be an implementation of the reference RF rectifier 220.

As shown, four RF rectifiers 610-613 are coupled together in a first daisy chain and four RF rectifiers 614-617 are coupled together in a second daisy chain. The output of the RF rectifier 613 is coupled to the output of the RF rectifier 617 to generate Vharvest voltage. The loaded RF rectifier voltage VL and the open circuit output voltage $V_{OC}$ may be provided by the RF rectifier 614 and the reference RF rectifier 620, respectively. The voltages VL and $V_{OC}$ may be provided to a monitor and control block to control an impedance of a voltage regulator and optimize power transfer from the RF rectifiers to the voltage regulator and the load (monitor and control block, voltage regulator, and load not shown for simplicity). In the example of FIG. 6, the Vharvest voltage of the four-stage rectifier 600 may be a lower voltage compared to the Vharvest voltage associated with the eight-stage rectifier 500.

Figure 7:
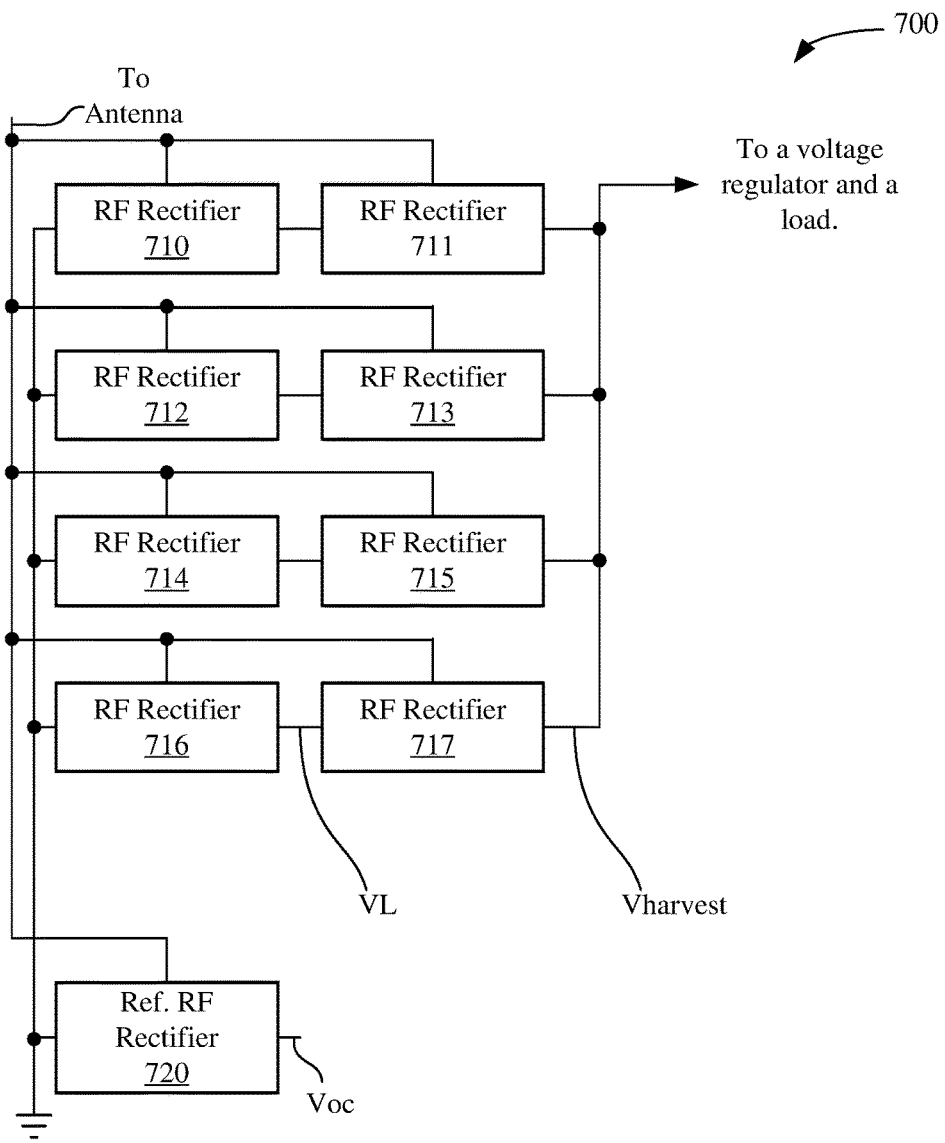
FIG. 7 shows yet another implementation of a two-stage rectifier, within which aspects of the present disclosure may be implemented.

FIG. 7 shows yet one implementation of a two-stage rectifier 700, within which aspects of the present disclosure may be implemented. The two-stage rectifier 700 may include eight RF rectifiers 710-717, and a reference RF rectifier 720. The RF rectifiers 710-717 may be implementations of any of the RF rectifiers 210-212 of FIG. 2. Similarly, the reference RF rectifier 720 may be an implementation of the reference RF rectifier 220.

As shown, two RF rectifiers 710-711 are coupled together in a first daisy chain. Similarly, RF rectifiers 712-713 are coupled together in a second daisy chain, RF rectifiers 714-715 are coupled together in a third daisy chain, and RF rectifiers 716-717 are coupled together in a fourth daisy chain. The output of the RF rectifiers 711, 713, 715, and 717 are coupled together to generate the Vharvest voltage. The loaded RF rectifier voltage VL and the open circuit output voltage $V_{OC}$ may be provided by the RF rectifier 716 and the reference RF rectifier 720, respectively. The voltages VL and $V_{OC}$ may be provided to a monitor and control block to control an impedance of a voltage regulator and optimize power transfer from the RF rectifiers to the voltage regulator and the load (monitor and control block, voltage regulator, and load not shown for simplicity). In the example of FIG. 7, the Vharvest voltage of the two-stage rectifier 700 may be a lower voltage compared to the Vharvest voltage associated with the eight-stage rectifier 500 and the four-stage rectifier 600.

Figure 8:
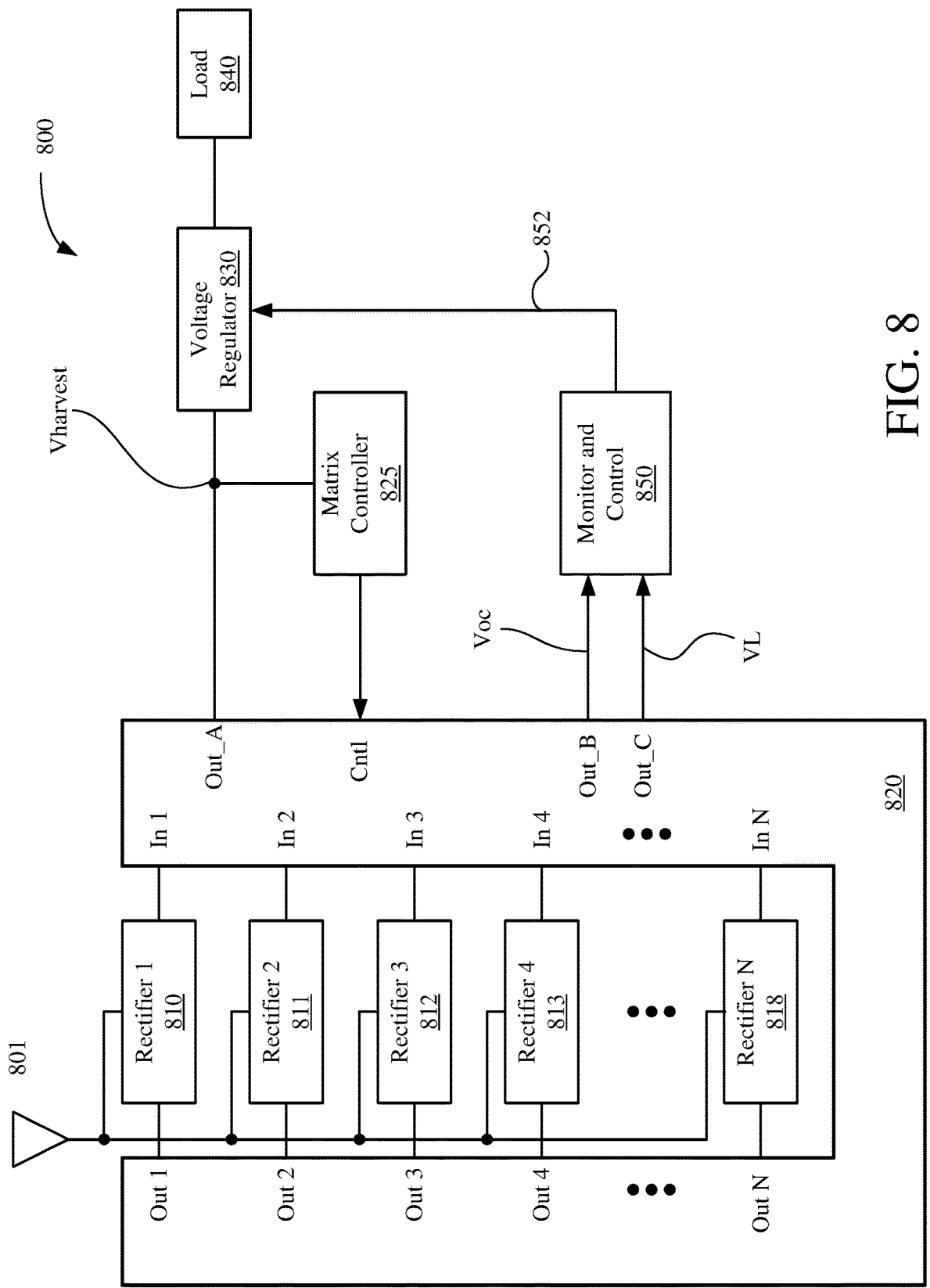
FIG. 8 shows a block diagram of a wireless device, within which aspects of the present disclosure may be implemented.

FIG. 8 shows a block diagram of a wireless device 800, within which aspects of the present disclosure may be implemented. The wireless device 800 may include an antenna 801, RF rectifiers 810-818, configurable matrix 820, matrix controller 825, a voltage regulator 830, a load 840, and a monitor and control block 850. The RF rectifiers 810-818 may be implementations of any the RF rectifiers 210-212 of FIG. 2. Similarly, the antenna 801, the voltage regulator 830, the load 840, and the monitor and control block 850 may be implementations of the antenna 201, the voltage regulator 230, the load 240, and the monitor and control block 250, respectively. Although the wireless device 800 includes nine RF rectifiers 810-818, other implementations may include any feasible number of RF rectifiers.

The configurable matrix 820 may be a fully configurable, analog matrix with N inputs (e.g., N ports to receive an input analog signal) and P outputs (e.g., P ports to provide an output analog signal). In some implementations, the configurable matrix 820 may include any feasible number of controllable analog switches, transistors, interface circuits and the like to implement the analog matrix. A control input (denoted Cntl) may direct the configurable matrix 820 to couple any of the N inputs to any of the P outputs.

In some implementations, each output voltage from the RF rectifiers 810-818 may be coupled to one of the N inputs. Some of the P outputs may be coupled to the inputs of the RF rectifiers 810-818. In addition, one of the P outputs (denoted Out_A) may be configured to provide the Vharvest voltage to the matrix controller 825 and the voltage regulator 830. Two of the P outputs (denoted Out_B and Out_C) may be configured to provide the $V_{OC}$ and VL voltages to the monitor and control block 850.

Because the configurable matrix 820 can connect any of the N inputs to any of the P outputs, the configurable matrix 820 can configure the RF rectifiers 810-818 in a variety of configurations. For example, in a first configuration, the configurable matrix 820 can couple the RF rectifiers 810-817 in a daisy chain similar to the eight-stage rectifier 500 of FIG. 5. In a second configuration, the configurable matrix 820 can couple the RF rectifiers 810-817 as two daisy chains similar to the four-stage rectifier 600 of FIG. 6. In a third configuration, the configurable matrix can couple the RF rectifiers 810-817 as four daisy chains similar to the two-stage rectifier 700 of FIG. 7. The example configurations described herein are merely illustrative and not limiting. Other configurations of the RF rectifiers 810-818 are possible.

One of the RF rectifiers 810-818 may be selected to operate as the reference RF rectifier and provide the $V_{OC}$ voltage. In a similar manner, one of the RF rectifiers 810-818 may be selected to provide the VL voltage. The configurable matrix 820 may provide the $V_{OC}$ and VL voltages to the monitor and control block 850. Similar to the monitor and control block 250, a ratio of the VL and $V_{OC}$ voltages may be monitored to determine impedance adjustments for the voltage regulator 830 to optimize power transfer. Impedance adjustments may be made through an impedance control signal 852 provided to the voltage regulator 830. As described with respect to FIGS. 2 and 4, the monitor and control block 850 may adjust the impedance of the voltage regulator 830 to optimize power transfer from the RF rectifiers used to generate the Vharvest voltage. In some aspects, the configurable matrix 820 may be configured to provide single-ended $V_{OC}$ and VL voltages (as described with respect to FIG. 2), or differential $V_{OC}$ and VL voltages (as described with respect to FIG. 4) to the monitor and control block 850.

The matrix controller 825 may monitor the output voltage of the RF rectifiers (Vharvest) provided to the voltage regulator 830. In some implementations, the matrix controller 825 may change the configuration of the configurable matrix 820 based on the Vharvest voltage. For example, if the matrix controller 825 determines that the Vharvest voltage is greater than a first threshold, then the matrix controller 825 may configure the configurable matrix 820 to connect fewer RF rectifiers in a daisy chain thereby reducing the Vharvest voltage. On the other hand, if the matrix controller 825 determines that the Vharvest voltage is less than a second threshold (possibly different from the first threshold), then the matrix controller 825 may configure the configurable matrix 820 to connect more RF rectifiers in the daisy chain thereby increasing the Vharvest voltage.

In some aspects, the monitor and control block 850 may respond relatively quickly to changes in monitored voltages ($V_{OC}$ and VL) from the RF rectifiers. Response time may, at least in part, be based on the speed of the comparison of the respective voltages. Since the comparison may be quick (especially when the comparisons are implemented with an analog comparator), overall response time of the monitor and control block 850 may be quick. In contrast, response time of the matrix controller 825 to changes in the Vharvest voltage may be slower. A slower response time for the matrix controller 825 may be desirable to allow output voltages of the RF rectifiers to settle after changes in the configurable matrix 820. In some implementations, response time of the matrix controller 825 may be determined, at least in part, by the first and second voltage thresholds. Setting the first and second voltage thresholds farther apart may increase response time allowing the Vharvest voltage to change more before adding or subtracting RF rectifiers to generate the Vharvest voltage. On the other hand, setting the first and second voltage thresholds closer together may decrease response time allowing a smaller change of the Vharvest voltage before adding or subtracting RF rectifiers.

Figure 9:
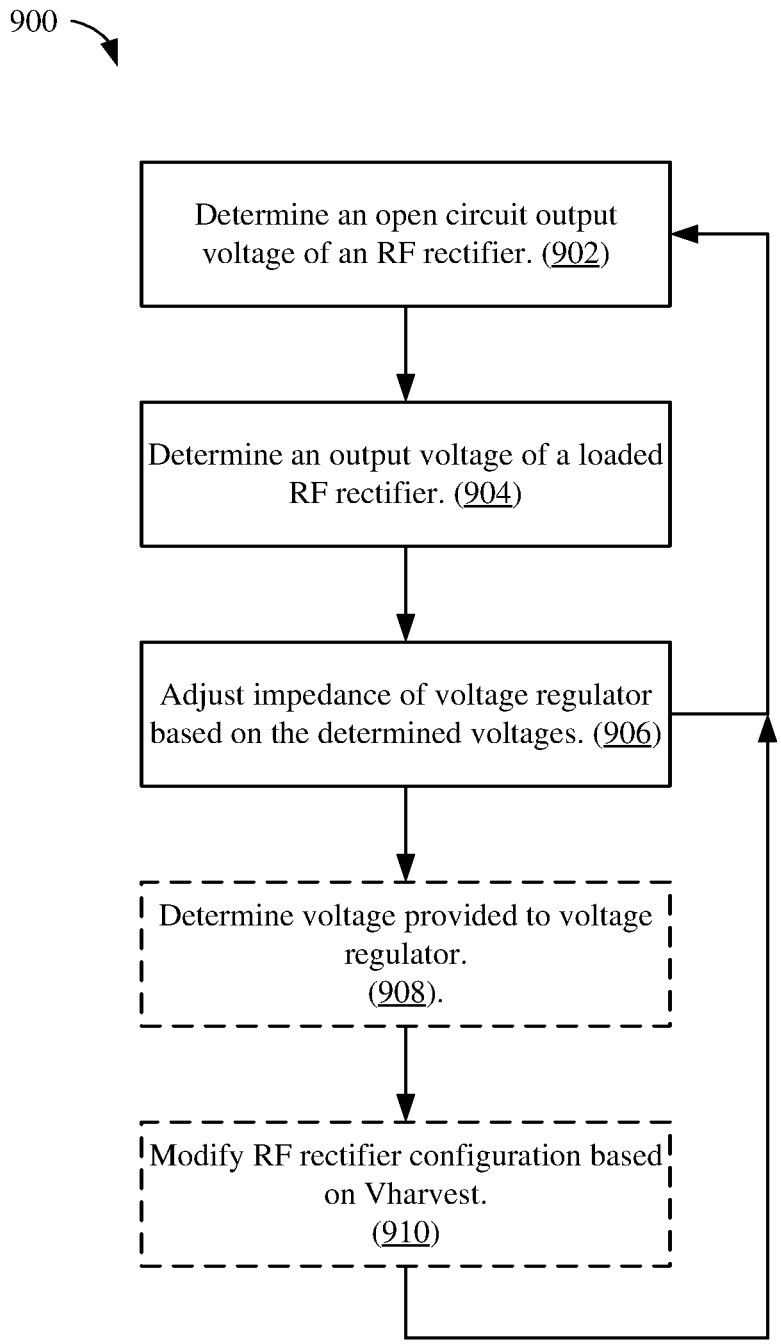
FIG. 9 is a flowchart depicting an example operation for operating a wireless device, within which aspects of the present disclosure may be implemented.

FIG. 9 is a flowchart depicting an example operation 900 for operating a wireless device, within which aspects of the present disclosure may be implemented. Although described herein as being performed by the wireless device 800 of FIG. 8, the operation 900 may be performed by the wireless device 200 of FIG. 2, the wireless device 400 of FIG. 4, or by any other suitable components or devices. Some implementations may perform the operations described herein with additional operations, fewer operations, operations in a different order, operations in parallel, and/or some operations differently.

The operation begins as the wireless device 800 determines an open circuit output voltage of an RF rectifier (902). For example, the monitor and control block 850 may determine the open circuit output voltage ($V_{OC}$) provided by an unloaded RF rectifier of the wireless device 800.

Next, the wireless device 800 determines an output voltage of a loaded RF rectifier (904). For example, the monitor and control block 850 may determine the output voltage (VL) may be provided by a loaded RF rectifier of the wireless device 800.

Next, the wireless device 800 adjusts the impedance of a voltage regulator based on the determined voltages (906). For example, the monitor and control block 850 may increase or decrease the impedance of the voltage regulator 830 based on a ratio of the output voltage of a loaded RF rectifier (VL) to the open circuit output voltage of an unloaded RF rectifier ($V_{OC}$). Operations may return to 902.

In some implementations, the wireless device 800 may optionally determine a voltage provided to a voltage regulator (908). (Optional operations are shown in dashed lines in FIG. 9.) For example, the matrix controller 825 may determine and/or measure the Vharvest voltage provided by one or more RF rectifiers. Next, the wireless device 800 may configure the RF rectifiers based on the determined voltage (910). For example, the matrix controller 825 may compare the Vharvest voltage to one or more thresholds and add or remove RF rectifiers from a serial configuration based at least in part on the Vharvest voltage. Operations may return to 902.

In the foregoing specification, the example embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A wireless device comprising:
a first radio-frequency (RF) rectifier configured to generate a first voltage from an RF signal;
a second RF rectifier configured to generate a second voltage from the RF signal, wherein the second voltage is an open circuit output voltage;
a voltage regulator coupled to the first RF rectifier and configured to regulate the first voltage to provide power to the wireless device; and
a controller configured to control power transfer from the first RF rectifier to the voltage regulator by adjusting an input impedance of the voltage regulator based at least in part on the first voltage and the second voltage.

2. The wireless device of claim 1, wherein the voltage regulator is one of a buck switching regulator, boost switching regulator, or buck/boost switching regulator, and wherein the input impedance of the voltage regulator is controlled by changing a period, duty cycle, or frequency of buck or boost operations of the voltage regulator.

3. The wireless device of claim 1, wherein the controller is configured maintain a voltage ratio between the first voltage and the second voltage.

4. The wireless device of claim 3, wherein the voltage ratio is approximately 0.5.

5. The wireless device of claim 3, wherein the voltage ratio is programmable.

6. The wireless device of claim 1, further comprising:
a third RF rectifier configured to generate a third voltage, wherein, the first RF rectifier is further configured to add the third voltage to the first voltage to generate a combined voltage; and
wherein the voltage regulator is further configured to regulate the combined voltage to provide power to the wireless device.

7. The wireless device of claim 6, further comprising:
a controller configured to dynamically control operation of the first and third RF rectifiers based on the combined voltage.

8. A method of optimizing power transfer from radio-frequency (RF) rectifiers to a voltage regulator of a wireless device, the method comprising:
generating, by a first RF rectifier, a first voltage;
generating, by a second RF rectifier, a second voltage, wherein the second voltage is an open circuit output voltage;
regulating, by the voltage regulator, the first voltage to provide power to a wireless device; and
controlling power transfer from the first RF rectifier to the voltage regulator by adjusting an input impedance of the voltage regulator based at least in part on the first voltage and the second voltage.

9. The method of claim 8, wherein the input impedance of the voltage regulator is controlled by changing a period, duty cycle, or frequency of buck or boost operations of the voltage regulator.

10. The method of claim 8, wherein the controlling includes maintaining a voltage ratio between the first voltage and the second voltage.

11. The method of claim 10, wherein the voltage ratio is programmable.

12. The method of claim 8, further comprising:
generating, by a third RF rectifier a third voltage, wherein the third voltage is added to the first voltage, by the first RF rectifier, to generate a combined voltage; and
regulating the combined voltage to provide power to the wireless device.

13. The method of claim 12, further comprising:
dynamically controlling operation of the first and the third RF rectifiers based on the combined voltage.

14. An apparatus comprising:
means for generating a first voltage via a first radio-frequency (RF) rectifier;
means for generating a second voltage via a second RF rectifier, wherein the second voltage is an open circuit output voltage;
means for regulating, via a voltage regulator, the first voltage to provide power to a wireless device; and
means for controlling power transfer from the first RF rectifier to the voltage regulator by adjusting an input impedance of the voltage regulator based at least in part on the first voltage and the second voltage.

15. The apparatus of claim 14, wherein the input impedance of the voltage regulator is controlled by changing a period, duty cycle, or frequency of buck or boost operations of the voltage regulator.

16. The apparatus of claim 14, wherein the controlling includes maintaining a voltage ratio between the first voltage and the second voltage.

17. The apparatus of claim 14, further comprising:
means for generating a third voltage, via a third RF rectifier, wherein the third voltage is added to the first voltage, by the first RF rectifier, to generate a combined voltage; and
regulating the combined voltage to provide power to the wireless device.

* * * * *